Oct. 11, 1955  J. B. POLOMSKI  2,720,124
TRANSMISSION

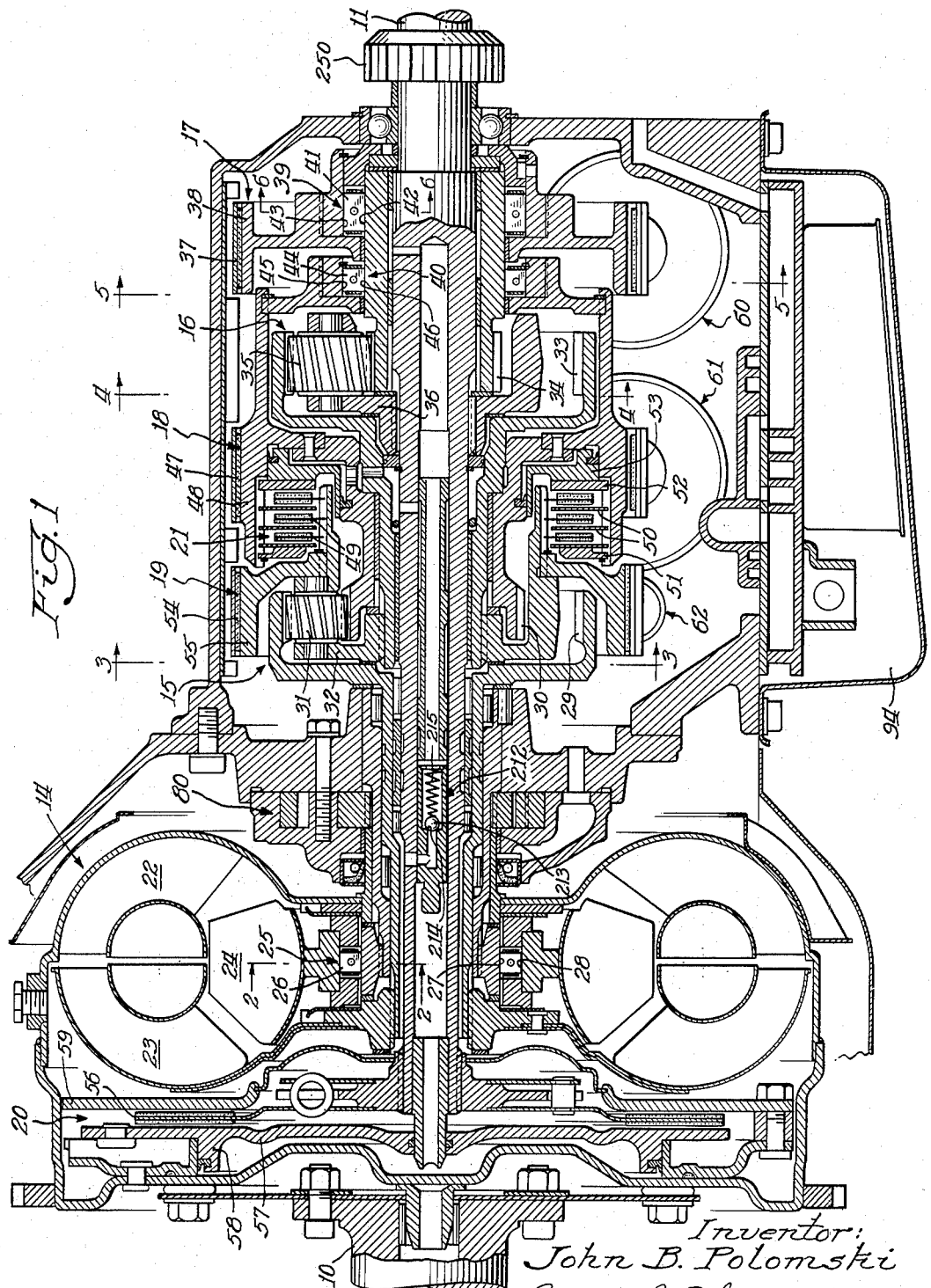

Filed Oct. 9, 1950  5 Sheets-Sheet 2

Inventor:
John B. Polomski
By: Edward C. Gritzbaugh
Atty.

Oct. 11, 1955  J. B. POLOMSKI  2,720,124
TRANSMISSION
Filed Oct. 9, 1950  5 Sheets-Sheet 3

Inventor:
John B. Polomski
By: Edward C. Fitzbaugh
Atty.

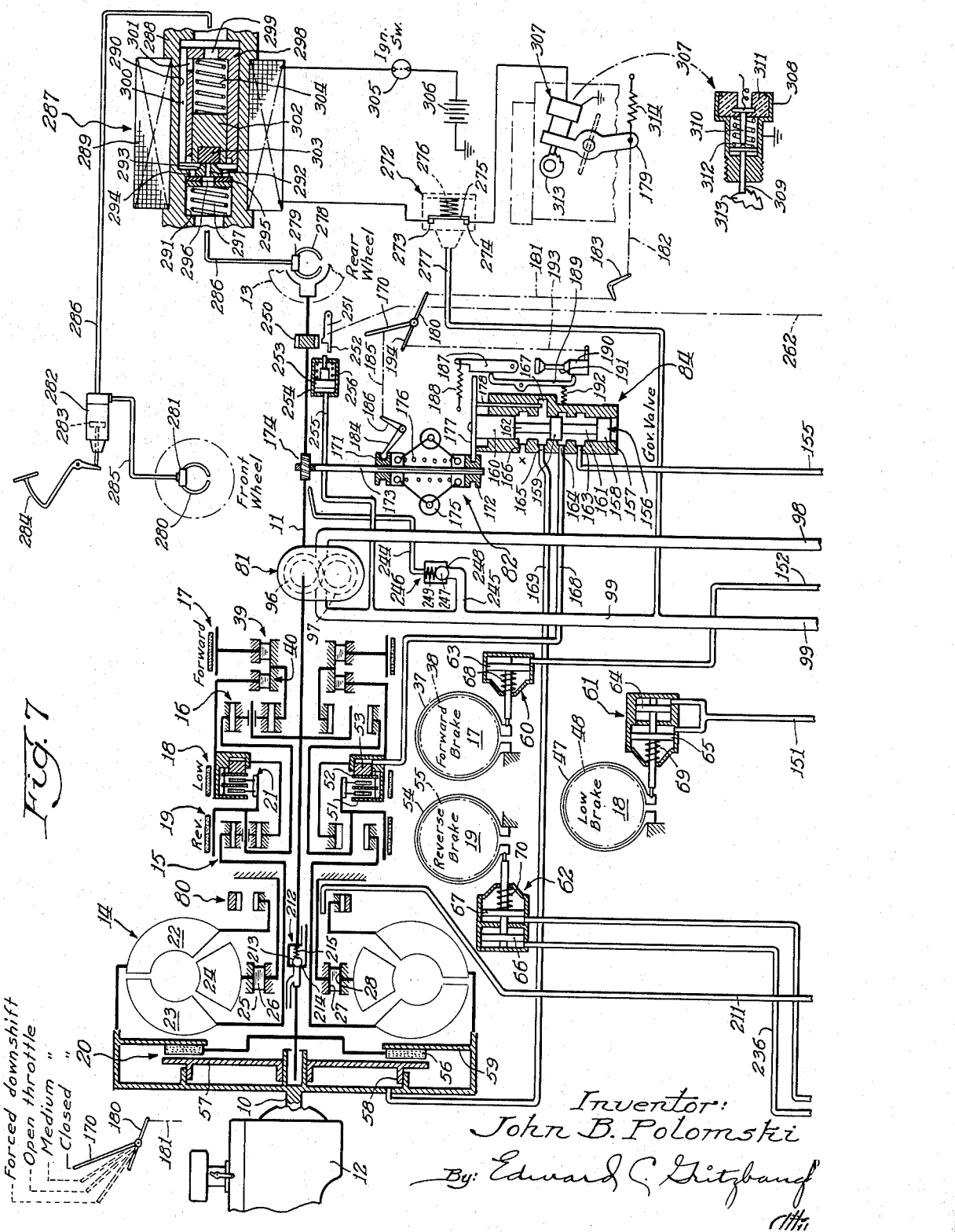

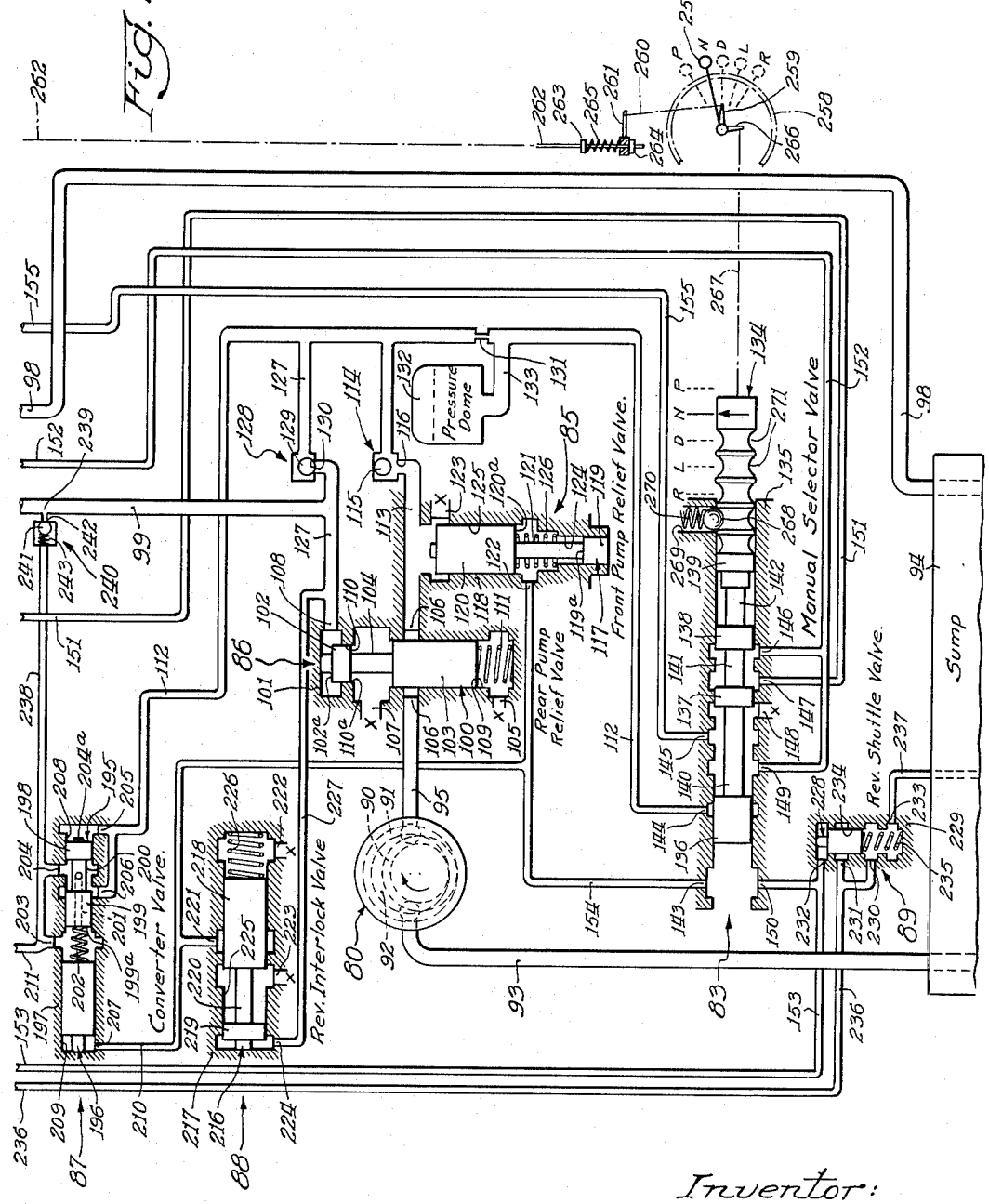

United States Patent Office 2,720,124
Patented Oct. 11, 1955

2,720,124

TRANSMISSION

John B. Polomski, Detroit, Mich., assignor to Borg-Warner Corporation, Chicago, Ill., a corporation of Illinois Application October 9, 1950, Serial No. 189,164

21 Claims. (Cl. 74—732)

My invention relates to power transmissions particularly for automotive vehicles and more specifically to hydraulic controlling mechanism for such transmissions.

Hydraulically controlled transmissions are commonly provided with a pump driven by the drive shaft of the transmission and a pump driven by the driven shaft of the transmission for providing a source of hydraulic pressure. Such a transmission commonly includes fluid pressure engaged brakes and clutches for completing various drives through the transmission, and a preferred form of hydraulically controlled transmission includes a vaned hydrodynamic torque converter which is in one or more of the drives between the drive and driven shafts. The pumps provide fluid pressure for both the brakes and clutches and also for the hydrodynamic device, and two of them are used instead of just one so that when only one of the drive or driven shafts of the transmission is rotated, as when the engine of the vehicle is inoperative and the vehicle is moving or when the engine is operative and the vehicle is stationary, there will be a source of fluid pressure due to at least one of the pumps being driven.

Preferably a dump valve under the control of the pressure output of the driven shaft pump is provided in connection with the two pumps for the purpose of deactivating the pump driven by the drive shaft of the transmission when the pump driven by the driven shaft and in accordance with the motion of the vehicle becomes operative. When the vehicle is moving, only the driven shaft pump need be utilized, and the power required for driving the drive shaft pump may be saved.

I have found with such a hydraulic transmission including the hydraulic torque converter and the two pumps that when this dump valve moves to deactivate the drive shaft pump, after the driven shaft pump speed has increased to a substantial speed, the dump valve puts such an abrupt load on the driven shaft pump that its pressure decreases unduly causing the dump valve to move back into its drive shaft pump activating position, and the dump valve shuttles and vibrates between its front pump activating and deactivating positions, and it is an object of the present invention to provide an improved hydraulic system in which the driven shaft pump gradually rather than suddenly takes the load of the hydraulic system as the dump valve moves to its drive shaft pump deactivating position. In this connection, it is a more particular object of the invention to provide a connection between the driven shaft pump and the hydraulic torque converter, so that as the driven shaft pump increases in speed prior to movement of the dump valve, it provides fluid under pressure for the torque converter and thus gradually takes the load of the hydraulic system whereby when the dump valve finally moves, a relatively smaller load than without such connection is put on the driven shaft pump, and vibration and shuttling of the drive shaft pump dump valve is avoided.

The invention consists of the novel constructions, arrangements and devices to be hereinafter described and claimed for carrying out the above stated objects and such other objects as will appear from the following description of a preferred embodiment of the invention illustrated with reference to the accompanying drawings, wherein:

Fig. 1 is a longitudinal sectional view of a transmission with which my improved hydraulic controlling mechanism may be used;

Figure 5:
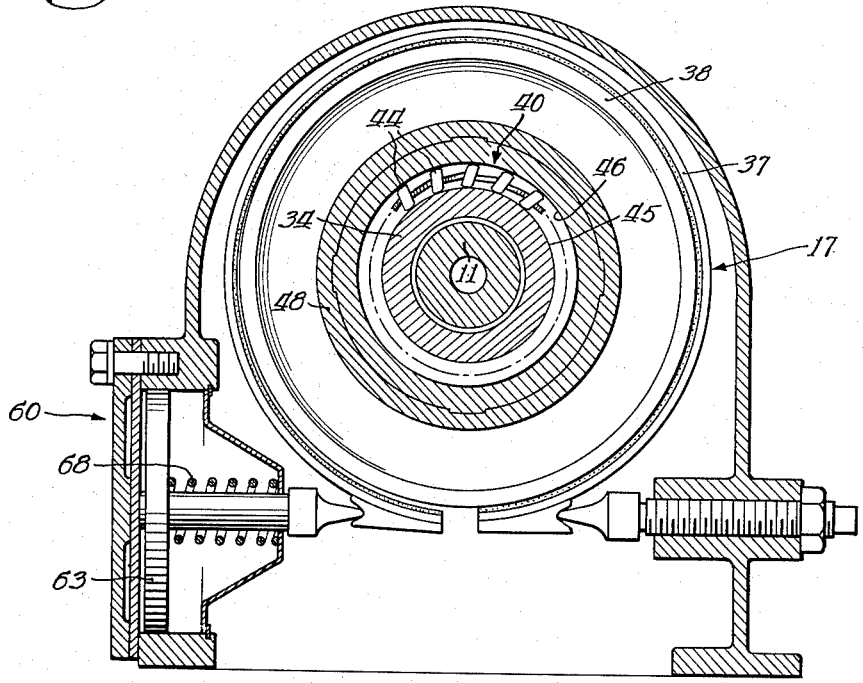
Figure 6:
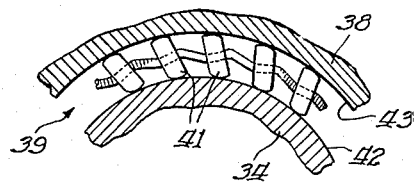
Figure 3:
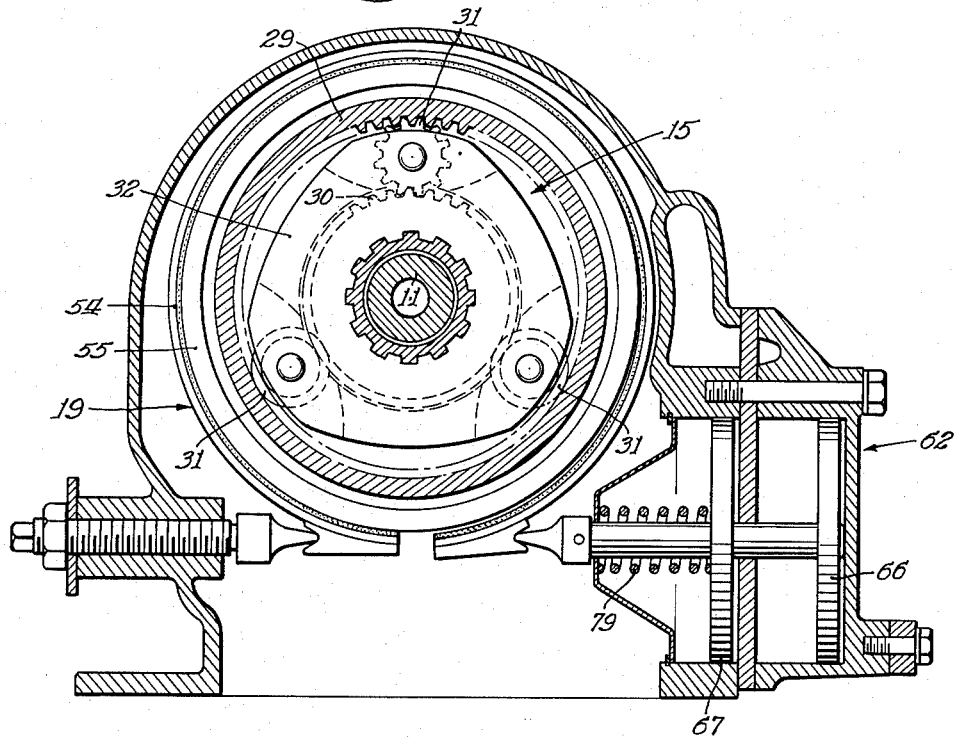
Figure 4:
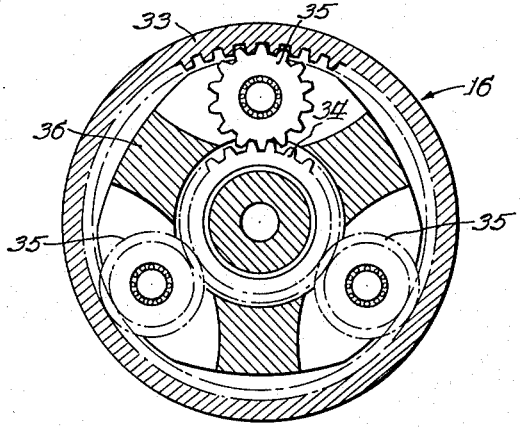

Figs. 3, 4 and 5 are sectional views taken respectively on lines 3—3, 4—4 and 5—5 of Fig. 1 in the directions indicated;

Fig. 6 is a sectional view on an enlarged scale taken on line 6—6 of Fig. 1 in the direction indicated; and Figs. 7 and 7a taken together with Fig. 7 disposed above Fig. 7a constitute a schematic view of the transmission shown in the preceding figures and a hydraulic control system for the transmission embodying the principles of the invention.

Like characters of reference designate like parts in the several views.

The transmission illustrated comprises a drive shaft 10 and a driven shaft 11. The drive shaft 10 is adapted to be driven by the engine 12 of the vehicle in which the transmission is installed, and the driven shaft 11 is adapted to drive the rear road wheels 13 of the vehicle through any suitable drive connections.

The transmission comprises in general a hydraulic torque converter 14, a planetary gear set 15, a second planetary gear set 16, a forward drive brake 17, a low speed lockup brake 18, a reverse brake 19, a high speed forward drive clutch 20 and an intermediate speed clutch 21.

Figure 2:
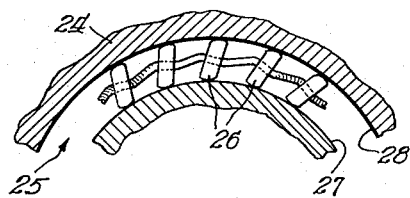
Fig. 2 is a sectional view on an enlarged scale taken on line 2—2 of Fig. 1 in the direction indicated.

The hydraulic torque converter 14 comprises a bladed impeller 22, a bladed runner or driven element 23 and a bladed stator or reaction element 24. The impeller 22 is connected to be driven from the drive shaft 10. The stator 24 is connected with a one-way brake 25 which is effective for holding the stator 24 against rotation in the reverse direction, that is, in the direction of rotation opposite to that of the drive shaft 10. The brake 25 may be of any suitable construction and may, for example, comprise tiltable sprags 26 disposed between and engageable with inner and outer cylindrical raceways 27 and 28 as shown in Fig. 2.

The planetary gear set 15 comprises a ring gear 29, a sun gear 30, a plurality of planet gears 31 in mesh with the sun and ring gears and a planet gear carrier 32 for the planet gears 31. The second planetary gear set 16 comprises a ring gear 33, a sun gear 34, a plurality of planet gears 35 in mesh with the sun and ring gears and a planet gear carrier 36. The ring gear 29 of the first planetary gear set is connected to be driven by the runner 23 of the torque converter 14, and the planet gear carrier 32 of this gear set is connected with the ring gear 33 of the second planetary gear set 16. The planet gear carrier 36 of the second gear set is connected with the driven shaft 11.

The friction brake 17 comprises a brake band 37 engageable with a drum 38, and the brake 17 is effective through a one-way brake 39 for braking the sun gear 34 and is effective through a second one-way brake 40 as well as the first one-way brake 39 disposed in series with the brake 40 for braking the sun gear 30. The one-way brakes 39 and 40 may be of any suitable well known construction and may be of the sprag type similar to the brake 25. The one-way brake 39 comprises sprags 41 engageable with inner and outer cylindrical races 42 and 43, and the brake 40 comprises sprags 44 engageable between inner and outer cylindrical races 45 and 46. Looking in the same direction at the brakes 39 and 40, the sprags of the two brakes are disposed in opposite directions between the inner and outer races, as is apparent from Figs. 5 and 6, for purposes presently to be mentioned.

The brake 18 comprises a brake band 47 engageable on a brake drum 48 connected with the sun gear 30 for augmenting the braking action of the one-way brakes 39 and 40, and the friction brake 17 on the sun gear 30. The friction clutch 21 comprises discs 49 rotatable with the planet gear carrier 32, discs 50 rotatable with the sun gear 30, opposite pressure plates 51 and 52 and a fluid pressure actuated piston 53 for moving the plate 52 toward the plate 51 to frictionally engage the two sets of friction discs with each other for engaging the clutch 21.

The reverse brake 19 comprises a brake band 54 engageable with a brake drum 55 connected with the carrier 32 of the planetary gear set 15 and with the ring gear 33 of the planetary gear set 16. The clutch 20 comprises a clutch disc 56 connected with the driven shaft 11, and an axially movable pressure plate 57 having a fluid pressure actuated piston portion 58 and an axially stationary pressure plate 59 both rotatable with the the drive shaft 10 and between which the disc 56 is engaged.

Each of the brakes 17, 18 and 19 is engaged by a fluid pressure actuated servomotor, the brakes 17, 18 and 19 being respectively engaged by servomotors 60, 61, and 62. The servomotor 60 comprises a fluid pressure actuated piston 63 for engaging the brake band 37 on the drum 38; servomotor 61 comprises fluid pressure actuated pistons 64 and 65 for engaging the brake band 47 on the drum 48; and the servomotor 62 comprises pistons 66 and 67 for engaging the brake band 54 on the drum 55. Return springs 68, 69 and 70 are provided in the servomotors 60, 61 and 62, respectively, for disengaging the bands from the drums.

In operation, the transmission provides low, intermediate and direct forward speed drives and a drive in reverse. The transmission, when the clutches 20 and 21 and the brakes 17, 18 and 19 are all disengaged, is in a neutral condition, and the shaft 11 is not driven from the shaft 10 when the latter is rotated by the engine 12. The low speed forward drive may be completed by engaging the brakes 17 and 18. The sun gear 34 is braked by means of the friction brake 17 and the one-way brake 39 from rotation, and the sun gear 30 is braked by the friction brake 18 and the one-way brake 40 from the sun gear 34. The runner 23 in the torque converter 14 is driven through the medium of the fluid in the torque converter from the impeller 22 and the drive shaft 10, and the runner 23 drives the ring gear 29 of the gear set 15. The sun gear 30 of this gear set is braked to be stationary as has just been described, and the planet gears 31 planetate between the sun gear 30 and the ring gear 29 to drive the carrier 32 at a reduced speed and increased torque in the forward direction. The ring gear 33 of the second planetary gear set 16 is connected with the carrier 32 and is driven thereby. The sun gear 34 of the gear set 16 is braked to be stationary as has just been described, and the planet gears 35 of this gear set planetate between the ring gear 33 and the sun gear 34 and drive the planet gear carrier 36 which is connected with the driven shaft 11 at a further reduced speed and increased torque in the forward direction. The driven shaft 11 is thus driven at an increased torque with respect to that impressed on the drive shaft 10, an increase in torque taking place in each of the hydraulic torque converter 14, the planetary gear set 15 and the planetary gear set 16.

Intermediate speed forward drive through the transmission is completed by disengaging the brake 18 and engaging the clutch 21. The clutch 21 connects together the planet gear carrier 32 and the sun gear 30 of the planetary gear set 15 thereby locking up the gear set and causing all of its elements to rotate together as a unit. The ring gear 33 of the second planet gear set 16 is thereby driven from the runner 23 at the same speed as the runner, and the speed of the driven shaft 11 is thereby increased with respect to its speed in low speed forward drive.

Direct drive through the transmission is completed by engaging the clutch 20 which directly connects together the drive shaft 10 with the driven shaft 11. Both the clutch 21 and the brake 17 may be allowed to remain in engaged condition for this drive.

Reverse drive is completed through the transmission by engaging the reverse brake 19. The brake 19 functions to hold stationary the planet gear carrier 32 of the gear set 15 and the ring gear 33 of the gear set 16 connected with the carrier. The ring gear 29 is driven as in forward drives through the hydraulic torque converter 14 from the drive shaft 10, and the sun gear 30 is driven at a reduced speed in the reverse direction through the intermediary of the planet gear pinions 31 held against planetary rotation about the center of the shafts 10 and 11 by the brake 19. The sun gear 30 drives the sun gear 34 of the planetary gear set 16 through the one-way brake 40 which now functions as a clutch. The ring gear 33 of the gear set 16 being held stationary by the reverse brake 19 functions as the reaction element of the gear set 16 to drive the planet gear carrier 36 and thereby the driven shaft 11 in the reverse direction at a speed which is reduced below the speed of the sun gear 30 due to the action of the planet gear pinions 35 rotating within the ring gear 33.

The control mechanism for the transmission comprises, in general, a pump 80 driven by the drive shaft 10 of the transmission, a pump 81 driven by the driven shaft 11 of the transmission, a governor 82 driven by the latter shaft, a manual selector valve 83, a governor valve 84, a front pump relief valve 85, a rear pump relief valve 86, a converter valve 87, a reverse interlock valve 88, and a reverse shuttle valve 89.

The drive shaft pump 80 comprises an inner gear 90 driven through the intermediary of the impeller 22 of the torque converter 14 from the drive shaft 10 and an outer gear 91 eccentrically located with respect to the inner gear 90 and in mesh with the latter gear. A crescent shaped casing portion 92 separates the gears 90 and 91, as shown. The pump 80 is connected with an inlet conduit 93 and thereby with a fluid sump 94, and the pump is also connected with an outlet conduit 95. The pump is of a well known construction and operates, as is well understood, to pump fluid from the conduit 93 to the conduit 95 when the inner gear 90 is rotated in the direction indicated by the arrow on the gear and the outer gear 91 rotates in the same direction due to meshing engagement with the gear 90, the pumping action being due to the fluid carried by the gears 90 and 91 across the inner and outer faces of the crescent shaped casing portion 92.

The driven shaft pump 81 comprises a gear 96 driven by the driven shaft 11 in mesh with a gear 97. The pump 81 is connected with an inlet conduit 98 which is connected to draw fluid out of the sump 94, and the pump is connected with an outlet conduit 99.

The outlet conduit 95 of the drive shaft pump 80 is connected with the rear pump relief valve 86, as shown. The valve 86 comprises a piston 100 slidably disposed in a casing portion 101. The piston 100 has lands 102 and 103 and a groove 104 between the lands. The casing portion 101 is provided with a port 105, two connected ports 106, a port 107 and a port 108, as shown, and it has connected cavities 109 and 110 of respectively larger and smaller diameters in which the lands 103 and 102 are respectively slidable. A compression spring 111 is provided between the lower end of the piston 100 and the lower end of the cavity 109.

A regulated fluid pressure supply conduit 112 is connected by means of a branch conduit 113 with the ports 106 and the outlet conduit 95 for the pump 80. A check valve 114 comprising a ball 115 adapted to rest on a seat 116 is provided in the conduit 113 for allowing fluid flow through the conduit in only one direction. The ports 105 and 107 of the valve 86 are bleed ports adapted to freely discharge fluid into the sump 94.

The front pump relief valve 85 is connected with the conduit 113 as shown and comprises a piston 117 slidably disposed in a casing portion 118. The valve piston 117 comprises lands 119 and 120 and a groove 121 between the lands. The casing portion 118 has ports 122 and 123 as shown, the port 123 being a bleed port for freely discharging fluid into the sump 94. The casing portion 118 has cavities 124 and 125 of respectively smaller and larger diameters in which the lands 119 and 120 are respectively slidable, and the cavity 125 at its upper end is connected to the conduit 113. A spring 126 is provided between the land 120 and the upper edge of the cavity 124.

The outlet conduit 99 for the pump 81 is connected with the port 108 in the valve 86, and this conduit is also connected with the regulated pressure conduit 112 by means of a branch conduit 127. A check valve 128 is provided in the conduit 127 and comprises a ball 129 adapted to rest on a seat 130.

A flow metering and accumulator arrangement is provided in the regulated pressure conduit 112. This arrangement comprises a restriction 131 in the conduit 112 and a pressure dome 132 in the form of an inverted hollow receptacle connected by means of a conduit 133 with the conduit 112.

The regulated fluid pressure conduit 112 is connected with the manual selector valve 83. The valve 83 comprises a valve piston 134 slidably disposed in a casing portion 135. The piston 134 is provided with lands 136, 137, 138 and 139 and grooves 140, 141 and 142 between the lands. The casing portion is provided with ports 143, 144, 145, 146, 147, 148, 149 and 150. The port 148 is a bleed port through which fluid may freely discharge into the sump 94, and the port 144 is connected with the regulated fluid pressure conduit 112. The port 147 is connected by means of a conduit 151 with the brake servomotor 61 for applying fluid pressure at times to the pistons 64 and 65. The ports 146 and 149 are connected by means of a conduit 152 with the brake servomotor 60 for applying pressure at times to the piston 63, and the port 150 is connected by means of a conduit 153 with the brake servomotor 62 for applying fluid pressure to the piston 67. The port 143 is connected to the port 122 in the front pump relief valve 85 by means of a conduit 154.

The port 145 in the selector valve 83 is connected by means of a conduit 155 with the governor valve 84. The governor valve comprises a valve piston 156 slidably disposed in a casing portion 157. The piston 156 is provided with lands 158, 159 and 160 and grooves 161 and 162 between the lands. The casing portion 157 is provided with ports 163, 164, 165, 166 and 167. The port 166 is a bleed port adapted to freely discharge fluid into the sump 94; the port 163 is connected with the conduit 155; the port 164 is connected by means of a conduit 168 with the pressure piston 53 of the friction clutch 21; and the port 165 is connected by means of a conduit 169 with the pressure plate piston portion 58 of the friction clutch 20.

The piston 156 of the governor valve 84 is moved under the combined influence of the governor 82 and the accelerator 170 for the vehicle engine 12. The governor 82 comprises sleeves 171 and 172 splined onto a shaft 173 so as to rotate therewith. The shaft 173 is driven in timed relationship with the shaft 11 by means of any suitable gearing 174. A pair of fly balls 175 are linked to the sleeves 171 and 172 so as to tend to move the sleeves together under centrifugal force due to rotation of the shaft 173, and a spring 176 is provided between the sleeves 171 and 172 for counteracting this action of the fly balls. The sleeve 172 is connected with the valve piston 156, so that the sleeve 172 and valve piston move together, this connection being by means of a part 177 fixed to the piston 156 and fitting in a suitable groove in the sleeve 172. A relatively small plunger 178 is disposed in the governor valve casing 157 and is in communication with the port 167 and is adapted to exert force on the part 177.

The position of the sleeve 171 is variable and is determined in accordance with movement of the accelerator 170. The accelerator 170 is connected with the throttle lever 179 on the carburetor of the vehicle engine 12 by any suitable linkage, such as by an arm 180 fixed to move with the accelerator, links 181 and 182, and a bell crank 183 connecting the links. The accelerator 170 is connected with the sleeve 171 by means of a bell crank having one arm 184 fitting in a groove in the sleeve 171 and a link 185 connecting the accelerator and the other arm 186 of the latter bell crank.

A pivotally mounted latch 187 is provided for the part 177 and a spring 188 is provided for yieldably moving the latch into latching position with respect to the part 177. A lever 189 is provided for acting on the latch 187 by one end of the lever for moving the latch out of latching engagement with the part 177. The lever 189 is moved by means of a longitudinally movable rod 190 having a groove 191 into which the other end of the lever may enter. A spring 192 is provided to act on the lever 189 to hold the last mentioned end of the lever in contact with the rod 190. The rod 190 is movable with the accelerator 170, being connected therewith by means of a link 193 and a lever arm 194 fixed to move with the accelerator.

The converter valve 87 is connected with the regulated fluid supply conduit 112 and functions to supply a regulated lower pressure to the hydraulic converter 14. The valve 87 comprises valve pistons 195 and 196 disposed in a casing portion 197. The piston 195 is provided with lands 198 and 199 and a groove 200 between the lands. A passage 201 is provided through the piston 195 connecting the groove 200 and the left end of the piston. A spring 202 is provided between the pistons 195 and 196 for purposes hereinafter to be described. The casing portion 197 is provided with ports 203, 204, 205, 206 and 207 and is provided with cavities 208 and 209 of respectively smaller and larger diameters. The piston 195 is slidably disposed in the cavity 208 and the piston 196 is slidably disposed in the cavity 209. The port 207 is connected by means of a conduit 210 with the conduit 154 and the port 143 in the manual selector valve 83. The ports 203 and 204 are connected by means of a conduit 211 with the hydraulic torque converter 14 for supplying fluid under pressure thereto, and the ports 205 and 206 are connected with the regulated fluid pressure supply conduit 112.

The torque converter 14 is supplied with fluid under pressure from the conduit 211 as will be described, and fluid flows out of the torque converter through a check valve 212 located within the shaft 11 in the actual embodiment of the transmission and draining fluid to the sump 94. The check valve 212 comprises a ball 213 adapted to rest on a seat 214 and yieldably held on the seat by means of spring 215.

The reverse interlock valve 88 comprises a piston 216 disposed in a casing portion 217. The piston 216 has lands 218 and 219 and a groove 220 disposed between the lands. The casing portion has ports 221, 222, 223 and 224 and a cylindrical cavity 225 therein in which the piston 216 is slidably disposed. A spring 226 is disposed between an end of the cavity and the piston 216, as shown. The port 221 is connected with the conduit 210, and the port 224 is connected by means of a conduit 227 with the conduits 127 and 99. The ports 222 and 223 are bleed ports adapted to freely discharge fluid into the sump 94.

The reverse shuttle valve 89 comprises a piston 228 within a casing portion 229. The casing portion 229 is provided with ports 230, 231, 232, and 233 and a cylindrical cavity 234 therein in which the piston 228 is slidably disposed. A spring 235 is disposed between the lower end of the piston 228 and the lower end of the cavity 234. The ports 230 and 231 are connected by means of the conduit 236 with the servo motor 62 and particularly with its piston 66. The port 232 is connected with the conduit 153 and with the port 150 of the selector valve 83. The port 233 is connected to drain into the sump 94 by means of a conduit 237.

Connection is provided between the discharge conduit 99 for the driven shaft pump 81 and the conduit 211 supplying fluid under pressure to the hydraulic torque converter 14, and this connection comprises a conduit 238 and a restricted passage 239 in series therewith. A check valve 240 is provided between the passage 239 and conduit 238 and comprises a ball 241 adapted to rest on a seat 242 and yieldably held thereon by means of a spring 243.

A restricted passage 244 adapted to discharge fluid for lubricating purposes onto the governor gearing 174 is connected through a conduit 245 with the discharge conduit 99 for the driven shaft pump 81. A check valve 246 is disposed between the conduit 245 and passage 244 and comprises a ball 247 adapted to rest on a seat 248 and yieldably held thereon by means of a spring 249.

The transmission is preferably provided with a parking brake comprising a toothed wheel 250 fixed on the driven shaft 11 and a swingably mounted pawl 251 adapted to engage the toothed wheel 250. The pawl is provided with an extension 252 thereon, and a piston 253 actuated by the fluid pressure within the discharge conduit 99 of the driven shaft pump 81 is provided for preventing engagement of the pawl with the toothed wheel 250 when the output pressure of the driven shaft pump 81 is above a predetermined value. The piston 253 is slidably disposed in a hollow casing 254 connected by means of a conduit 255 with the conduit 99. A spring 256 is disposed within the casing 254 for yieldably holding the piston 253 retracted out of the path of movement of the extension 252 on the pawl 251.

The pawl 251 as well as the selector valve piston 134 are adapted to be moved by means of a manually operated selector lever 257 located coaxially with respect to and adjacent the steering wheel 258 of the vehicle. The selector lever is connected by any suitable linkage with the parking brake pawl 251, and such linkage may comprise an arm 259 swingable with the selector lever 257 and connected by means of a link 260 with a part 261 slidably disposed on a rod 262. The rod 262 is connected with the pawl 251 and has two stops 263 and 264 fixed thereon. A spring 265 is provided between the part 261 and the stop 263 for purposes hereinafter to be described. The selector lever 257 is operably connected with the selector valve piston 134 by means of an arm 266 fixed to the selector lever 257 to swing therewith and a link 267 connecting the arm 266 and piston 134.

Detent mechanism may be provided for yieldably holding the selector lever 257 and the piston 134 in a plurality of different positions indicated in the drawings as "P," "N," "D," "L" and "R" positions and which respectively correspond to a parking braking position of the pawl 251, a neutral condition of the transmission, a driving range condition of the transmission, low range forward drive and a reverse drive. This detent mechanism may comprise a ball 268 slidably disposed in a cylindrical cavity 269 in the casing portion 135 and a spring 270 yieldably holding the ball 268 in any of a plurality of grooves 271 provided in the piston 134 and corresponding to the different positions mentioned above of the valve piston 134 and selector lever 257.

A fluid pressure operated switch 272 forming a part of a vehicle braking system may also be connected to the output conduit 99 of the driven shaft pump 81 to be actuated by the output pressure of this pump. The switch 272 comprises a pair of contacts 273 and 274 adapted to be connected together by means of a combination switch arm and fluid pressure diaphragm 275. The diaphragm is acted on by a spring 276 for yieldably holding it in bridging relation with respect to the contacts 273 and 274, and the switch is connected by means of a conduit 277 with the discharge conduit 99 of the driven shaft pump 81.

The switch 272, as well as other controlling mechanism, is provided in conjunction with the ordinary braking system of the automotive vehicle for maintaining the rear automobile wheel brakes partially engaged at times, as will be more fully described hereinafter. The ordinary braking system of the vehicle comprises rear wheel brakes 278 (one being illustrated) each actuated by a fluid pressure motor 279 and front wheel brakes 280 (one being illustrated) each actuated by a fluid pressure motor 281. A master cylinder 282 is provided for supplying fluid under pressure to the motors 279 and 281 when vehicle braking is desired, and the master cylinder comprises a piston 283 which is arranged to be moved by means of the ordinary brake pedal 284 of the vehicle. The master cylinder 282 is connected by a fluid conduit 285 with the front wheel brake motors 281 and is connected by a fluid conduit 286 with the rear wheel brake motors 279.

A valve mechanism 287 which is electrically actuated to retain on the motors 279 for the rear wheel brakes a part of the fluid pressure applied to the motors 279 by the master cylinder 282 is provided in the conduit 286 between the master cylinder 282 and the motors 279. The valve mechanism 287 comprises a casing 288 of magnetizable material surrounded by an electric winding 289. The casing 288 has cylindrical cavities 290 and 291 therein which are connected by means of a central opening 292 provided in a conically shaped seating member 293 separating the cavities 290 and 291. A plurality of openings 294 are provided about the member 293, and these openings 294 also connect the cavities 290 and 291.

A washerlike valve member 295 is slidably disposed within the cavity 291 and has a central opening 296 in alignment with the opening 292. A spring 297 is disposed between an end of the cavity 291 and the valve member 295 for yieldably moving the valve member into blocking relationship with respect to the openings 294. A tubular armature 298 of magnetizable material is slidably disposed in the cavity 290. The armture 298 has a central opening 299, a longitudinal extending slot 300 in its outer surface and a laterally extending opening 301 therethrough connecting the slot 300 with the interior of the armature 298.

A valve member 302 having an insert 303 of yieldable material adapted to close the central opening 292 in the valve element 293 is slidably disposed within the armature 298. A spring 304 is provided within the armature 298 between an end of the cavity in the armature and the adjacent end of the valve member 302.

The winding 289 of the valve mechanism 287 is electrically connected with the contact 273 of the switch 272 and is electrically connected also with the ignition switch 305 of the automotive vehicle which in turn is connected with the one terminal of the vehicle battery 306, the other terminal of which is grounded.

An electric switch 307 is connected with the contact 274 of the switch 272. The switch 307 is mounted on the throttle lever 179 and comprises a metal casing 308 fixed within the lever 179. A contact 309 is slidably disposed within the casing 308, and a contact 310 is fixed within the casing 308 by means of an insulator block 311. A spring 312 is provided between the insulator block 311 and the movable contact 309. The contact 310 is electrically connected with the contact 274 in the switch 272, and the movable contact 309 is always in electrical contact with the casing 308 and is thereby grounded. The contact 309 is adapted to abut a stop 313 of the carburetor which functions to limit the throttle closing movement of the throttle lever 179 and at the same time move the contact 309 against the action of the spring 312 into electrical contact with the contact 310. Any suitable resilient means such as a spring 314 may be provided in accordance with ordinary practice for yieldably holding the throttle lever 179 in substantially closed throttle engine idling position, with the contact 309 coacting with the stop 313 to limit the throttle closing movement of the throttle lever 179 in lieu of the ordinary stop usually provided on such a lever.

The transmission is conditioned for various types of operation by moving the manually operated selector lever 257 and the valve piston 134 into any of their various positions which are the "P" or parking positions, the "N" or neutral positions, the "D" or drive range positions, the "L" or low range positions and the "R" or reverse drive positions, all of which are indicated in the drawings. The selector lever 257 and the selector valve piston 134 are shown in their neutral positions in the drawings. With the lever 257 and the valve position 134 being in their "P" or parking positions, the parking brake pawl 251 is in engagement with the toothed wheel 250 fixed on the driven shaft 11. The driven shaft 11 and therefore the rear driving wheels 13 of the vehicle are thus braked. When the selector lever 257 is moved from its neutral position to its parking position, the part 261 is moved by means of the lever 259 and link 260 so as to tend to move the pawl 251 into engagement with the wheel 250 through the intermediaries of the spring 265, stop 263 and the rod 262. If the pawl 251 should be out of register with any of the indentations between the teeth on the wheel 250, the pawl will be held under spring action from the spring 265 in engagement with these teeth, and full engagement of the pawl 251 and wheel 250 will not take place until the wheel 250 is rotated slightly, with corresponding movement of the shaft 11 and rear wheels 13. The pawl 251 is withdrawn from the wheel 250 when the selector lever 257 is moved from its parking position to its neutral position, and this withdrawal is a positive action, as contrasted with the resilient engaging action of the pawl by the spring 265, as the part 261 will contact the stop 264 fixed on the rod 262 and will pull the pawl 251 positively out of engagement with the wheel 250.

The transmission is conditioned for neutral in which there is no drive between the shafts 10 and 11 when the valve piston 134 and selector lever 257 are in their "N" positions. It is assumed that the vehicle engine 12 is in operation and the pump 80, which is driven through the impeller 22 from the drive shaft 10, draws fluid from the sump 94 through the conduit 93 and discharges it into the conduit 95. It flows between the opposite ports 105 in the valve 86 and through the conduit 113 into the regulated fluid pressure supply conduit 112. The check valve 114 is opened by the fluid from the pump 80, with the ball 115 being moved off its seat 116 to provide communication through the conduit 113 to the conduit 112. The pressure in the conduits 113 and 112 is maintained at a predetermined maximum by means of the front pump relief valve 85. The pressure in the conduit 113 is impressed on the upper end of the valve piston 117 and moves the valve piston 117 into substantially it illustrated position in which the land 120 allows fluid from the conduit 113 to flow through the bleed port 123 and thereby to the sump 94, this movement of the valve piston 117 into port cracking position being against the action of the spring 126. As will be apparent, a decrease in fluid pressure in the conduit 113 will allow the piston 117 to move upwardly under the influence of the spring 126 to decrease the port cracking effect of the land 120, and an increase in the fluid pressure in the conduit 113 functions to move the valve piston 117 further downwardly against the action of the spring 126 and increase the port cracking effect of the land 120, so that the net effect of the valve 85 is to maintain the fluid in the conduits 113 and 112 at a predetermined maximum pressure. In the neutral position of the selector valve piston 134, however, the land 136 of this piston blocks the port 144 for the conduit 112, so that this fluid pressure does not pass through the selector valve 83 to any of the brakes or clutches in the transmission for engaging them. The driven shaft 11 is assumed to be stationary, and the pump 81 therefore provides no output fluid pressure in its conduit 99.

The converter valve 87 is connected to the conduit 112 and functions to provide a regulated fluid pressure in the conduit 211 and thereby in the hydraulic torque converter 14 of less pressure than the fluid in the conduit 112. The pressure in the conduit 112 is impressed on the land end 204a of the valve piston 195 and tends to move the land 199 off the port 206 and admit fluid under pressure from the conduit 112 to flow through the groove 200 and port 204 into the conduit 211 connected with the torque converter 14. The fluid pressure in the conduit 211 is impressed on the land end 199a and augments the action of the spring 202 tending to move the valve piston 195 in the opposite direction. A balance is set up between the force from fluid pressure in the conduit 112 impressed on the right end of the piston 195 and the forces in the left end of the piston 195 due to the fluid under pressure in the conduit 211 impressed on the land face 199a and the spring 202 with the force on the right end of the piston tending to move it to further open the port 206 to the conduit 211 and the converter 14 and the force on the left end tending to do the opposite. An increased pressure in the conduit 211 will tend to move the piston 195 to the right to more fully close the port 206 by the land 199, and a decrease in pressure in the conduit 211 will do the opposite, and the valve piston 195 thus meters the flow of fluid from the conduit 112 to the conduit 211 and converter 14 between edges of the land 199 and port 206 and regulates the pressure in the conduit 211 and converter 14 to a predetermined value somewhat less than the pressure in the conduit 112.

The check valve 212 permits a discharge of fluid from the torque converter 14 to the sump 94 and a circulation of fluid through the torque converter for cooling the converter, and the valve 212 is open with the ball 213 being moved off its seat 214 when there is substantial fluid pressure existing in the converter supply conduit 211. The fluid from the check valve 212 preferably is passed between various moving parts of the transmission on its way to the sump for lubricating these parts. When the hydraulic system is inoperative, as for example, when the engine 12 and both pumps 80 and 81 are inoperative, the check valve 212 functions to maintain the torque converter substantially filled with fluid, so that the drainage from the torque converter 14 will not raise the level of fluid in the sump 94 unduly and the torque converter 14 will be immediately ready for starting the vehicle without having any substantial amount of air in it. When pressure exists in the conduit 211 it also exists in conduit 238 connected therewith; however, with substantially no pressure existing in the conduit 99 from the driven shaft pump 81, the check valve 240 is closed with its ball 241 resting on the seat 242, and no fluid from the conduit 211 and converter 14 can escape through the check valve 240 into the conduit 99.

Ordinary forward driving by means of the illustrated transmission is done in drive range in which the selector valve piston 134 is moved into its "D" position by means of the manual selector 257. In this position of the selector valve piston 134, driving is initially through the intermediate speed power train, and a change in speed ratio to high speed drive automatically subsequently takes place when the speed of the vehicle has increased sufficiently. When the selector valve piston 134 is in its "D" position, the conduit 112 which contains regulated pump pressure is connected by means of the groove 140 and ports 144 and 145 with the conduit 155 and is also connected by means of the groove 140 and port 149 with the conduit 152. The conduit 152 is connected with the servomotor 60 for the forward drive brake 17, and the brake 17 is thus applied by application of fluid pressure to the servopiston 63. The fluid pressure in the conduit 155 flows through the port 163 in the governor valve 84 and through the piston groove 161 and port 164 into the conduit 168 connected with the clutch piston 53 so that the clutch 21 is also engaged. The engagement of both the clutch 21 and brake 17 completes the intermediate speed power train, and the driven shaft 11 and the vehicle are started and are subsequently driven at increasing speeds by depressing the accelerator 170 and thereby increasing the power delivered from the engine 12.

In connection with this engagement of the forward brake 17 and the second speed clutch 21, the functions of the pressure dome 132 and the restriction 131 in the conduit 112 may be noted. When the selector valve piston 134 is first moved into its "D" position to provide fluid pressure to the conduits 152 and 155 from the pressure supply conduit 112, there is an initial surge of fluid from the conduit 112 through the groove 140 in the selector valve piston 134 and ports 149 and 145 into the conduits 152 and 155 due to the expansion of the body of air in the upper end of the pressure dome. This initial surge of fluid is sufficient for providing a quick initial, partial engagement of both the brake 17 and clutch 21 for taking up the slack in the brake and clutch. Subsequently, a metered flow of fluid through the restriction 131 takes place for providing a substantial slower and more gradual final engagement of the brake 17 and clutch 21, and during this metered flow through the restriction 131, the pressure of fluid in the pressure dome 132 again rises along with the increase in pressure in the conduits 155 and 152 to again raise the level of liquid within the pressure dome and compress the air in the upper part of the dome into its former restricted volume. Relatively shockless engagements of the friction brake 17 and friction clutch 21 are thus obtained.

The driven shaft pump 81, as the driven shaft 11 begins rotation and increases in speed, delivers fluid to its discharge conduit 99 and draws fluid from the sump 94 through its inlet conduit 98. The fluid pressure in the conduit 99 is impressed on the upper end of the valve piston 100 of the rear pump relief valve 86 through the conduit 127 and tends to move the valve piston 100 downwardly against the action of the spring 111. When the pressure in the conduit 99 has increased sufficiently, such movement of the piston 100 takes place, so that the land 102 of the piston 100 moves out of the cavity 110 to provide a cracking or small opening between the lower edge 110a of the cavity 110 and the upper edge 102a of the land 102 and thereby provide a limited communication between the bleed port 107 and the conduit 127. The valve 86 regulates the pressure to a predetermined maximum in the conduits 127 and 99, similar to the regulating action of the valve 85 of the pressure in the conduit 113 as previously described, tending to return to its illustrated position and more or less close the communication between the ports 108 and 107 with any decline in pressure in the conduit 99 to reduce the fluid bleed to the sump through the port 107 and tending to open farther with any increase in pressure in the conduit 99 to increase the bleed to the sump. The valve piston 100 when so moved to regulate the pressure in the conduit 99 connects the ports 106 and 107 with no restriction by means of its groove 104 and any fluid discharged by the pump 80 thus flows freely through the bleed port 107 in the valve 86 to thereby deactivate the drive shaft pump 80 and materially reduce the amount of power required for driving the pump 80. Under these conditions with the driven shaft pump 81 supplying substantial fluid under pressure, the check valve 128 is opened by the fluid pressure in the conduits 99 and 127 with the ball 129 being off its seat 130, and the regulated pressure in the conduit 112 is supplied by the driven shaft pump 81, exclusive of the drive shaft pump 80. Since the output conduit 95 of the drive shaft pump 80 is connected by means of the valve 86 with the bleed port 107, there is no fluid under pressure in the portion of the conduit 113 between the check valve 114 and the valve 86 tending to hold the check valve 114 open, and the check valve 114 closes with its ball 115 moving onto the seat 116 to prevent any of the fluid in the conduit 112 draining through the groove 104 in the valve 86 and bleed port 107 to the sump 94.

As is apparent, the fluid under pressure in the conduit 112 supplies not only the fluid pressure necessary for maintaining the clutch 21 and brake 17 engaged, but it also supplies the fluid pressure through the converter valve 87 to the hydraulic torque converter 14. As has been explained, there is a fluid flow through the torque converter 14 for purposes of cooling it, and the torque converter requires a substantial amount of fluid under pressure for its operation. I have found that when there is this change from the condition in which the drive shaft pump 80 supplies the fluid pressure to the conduit 112 to the condition in which the driven shaft pump 81 supplies this fluid pressure, there is an obnoxious shuttling and vibration of the rear pump relief valve 86 between positions opening and closing the port 107 with respect to the port 108 and conduits 127 and 99, assuming there is no means provided for allowing the pump 81 to gradually take the load of supplying the torque converter 14. I ascribe this undesirable operation of the rear pump relief valve 86 to the fact that the torque converter 14 has substantial fluid requirements, and the instantaneous drain on the driven shaft pump 81 provided when the valve piston 100 moves into its position regulating the output of the driven shaft pump is too great, so that the pressure in the conduit 99 decreases instantaneously and allows the valve piston 100 to tend to return to its illustrated position in which the drive shaft pump 80 is operative to provide the fluid under pressure in the conduit 112. I have therefore in accordance with the teachings of my invention provided a restricted communication between the output conduit 99 of the driven shaft pump 81 and the torque converter 14 and its inlet conduit 211 which I have found causes the rear pump relief valve 86 to cease such vibration and shuttling.

The conduit 238 and restricted passage 239 provide this communication between the discharge passage 99 of the driven shaft pump 81 and the inlet conduit 211 of the hydraulic torque converter 14. As the pressure in the discharge conduit 99 for the driven shaft pump 81 increases above the relatively low fluid pressure in the converter inlet conduit 211 with an increase in driving speed of the vehicle and consequent increase in fluid discharge by the pump 81 into a substantially closed system, the check valve 240 opens with its ball 241 moving off the seat 242, and there is an increasing amount of fluid passed through the conduit 238 and restricted passage 239 from the driven shaft pump 81 to the hydraulic converter 14. The restricted passage 239 in series with the conduit 238 functions to prevent an unduly great amount of fluid from being supplied to the hydraulic torque converter 14 from the driven shaft pump 81, and the check valve 240 prevents any fluid from the converter inlet conduit 211 and from the drive shaft pump 80 from being fed to the driven shaft pump 81 through its discharge passage 99 prior to an increase in pressure from the driven shaft pump 81 in the conduit 99 sufficient to open the check valve 240 against the pressure in the converter supply conduit 211. The restricted passage 239 and conduit 238 thus allow the driven shaft pump 81 to gradually take up the load of supplying fluid pressure to the hydraulic torque converter 14 before the pressure in the conduit 99 becomes great enough to move the rear pump relief valve piston 100 into its position cracking between its land edge 102a and the cavity edge 110a in which it regulates the pressure in the conduit 99 to a predetermined maximum and deactivates the front pump 80 by draining it to the sump 94 through the ports 106 and 107 and the groove 104. When this movement of the rear pump relief valve piston 100 finally takes place, the load of supplying the torque converter 14 with fluid is not suddenly put on the driven shaft pump 81 so that its pressure output in the conduit 99 does not as a result suddenly decrease to cause a return of the rear pump relief valve piston 100 to its original illustrated position, and shuttling of the rear pump relief valve piston 100 is thus prevented.

A change from second or intermediate speed drive to third speed drive is obtained automatically under the action of the governor 82. As is apparent, the centrifugal force on the weights 175 of the governor increases with the speed of the governor drive shaft 173 and the transmission driven shaft 11 and tends to move the weights 175 outwardly and the sleeves 171 and 172 together against the action of the spring 176. For a given position of the accelerator 170, the position of the sleeve 171 is fixed so that the sleeve 172 moves upwardly as seen in Fig. 7 under the action of the weights 175 and moves the valve piston 156 in the same direction through the intermediary of the part 177. On a predetermined movement of the piston 156 in this direction, the groove 161 of the piston will connect the ports 164 and 165 and will thereby provide communication from the conduit 155 having regulated fluid pressure therein with the conduit 169 and thereby with the clutch applying pressure plate 57. The clutch 20 will thus be applied, and the transmission will be in direct drive.

The accelerator 170 through the link 185 and bell crank 184–186 changes the location of the sleeve 171 of the governor 82, and the accelerator thus influences the speed of the shafts 173 and 11 at which the governor 82 is effective for causing a movement of the valve piston 156 into its direct drive position. The greater the accelerator depression and throttle opening, the farther downwardly on the shaft 147, as seen in Fig. 7 the sleeve 171 will be moved under the action of the accelerator 170, and the greater the speed of the governor 82 must be before it is effective to move the valve piston 156 upwardly as seen in Fig. 7 into its direct drive position. Thus the change in speed ratio from second speed to direct drive will be delayed in accordance with the amount of accelerator depression which reflects the vehicle operator's demand for vehicle acceleration and engine torque.

The plunger 178 functions when fluid pressure is supplied through the groove 161 to the port 165 and therefore to the port 167 aligned with the port 165 to provide a force augmenting the action of the governor 82 on increasing vehicle speed in moving the piston 156 upwardly, the plunger 178 acting through the intermediary of the part 177 on the piston 156. The plunger assures that a complete movement of the piston 156 shall occur once the piston 156 has moved sufficiently to supply fluid under pressure through the groove 161 to the ports 165 and 167 from the port 163, and the plunger functions also to hold the piston 156 in its third speed position longer than otherwise when the governor moves the valve piston from its third speed position to its second speed position. The plunger thus prevents any hunting of the valve piston 156 between its intermediate speed and high speed drive positions and assures a full engagement of the clutch 20 rather than any partial engagement which might result if only a restricted communication existed between the conduits 155 and 169.

A return from third speed drive to intermediate speed drive is primarily under the control of the governor 82, a decrease in speed of the governor and of the vehicle functioning to initiate such a change. A reduced speed of the governor 82 causes the spring 176 to tend to separate the governor sleeves 171 and 172 and move the sleeve 172 and valve piston 156 downwardly as seen in Fig. 7 into the intermediate speed position of the latter, assuming the accelerator 170 and the sleeve 171 are not moved. A throttle opening movement of the accelerator 170 also has this effect since it moves the sleeve 171 downwardly as seen in Fig. 7 tending to cause a similar downward movement of the entire governor assembly and valve piston 156. The latch 187 counteracts and overcomes this tendency of the valve piston 156 to return from its third speed position to its second speed position when the accelerator is in a range of positions between a closed throttle position and a forced downshift position which are indicated in Fig. 7. When the accelerator 170 is in this range, the rod 190 is located in a position below its Fig. 7 position due to its connection with the accelerator by means of the link 193, so that its groove 191 receives the lower end of the lever 189 under the action of the spring 192, and the lever 189 is ineffective on the latch 187, and the latter is in latching relation with respect to the part 177 and the piston 156, assuming that the piston has previously been moved under the action of the governor 82 into its direct drive position. When, however, the accelerator is in either its closed throttle position or its forced downshift position beyond its open throttle position, the rod 190 at an end of the groove 191 contacts the lower end of the lever 189 and holds it against an action of the spring 192 in its illustrated position in which the latch 187 is held retracted from the part 177 against the action of the spring 188. When the accelerator is in its closed throttle position and the speed of the vehicle decreases sufficiently, the governor piston 156 is free to move and does move from its third speed position to its second speed position under the control of the governor, and the piston may make the same movement under the control of the accelerator when the vehicle operator desires a change downwardly in speed ratio as evidenced by a movement of the accelerator to its forced downshift position.

Low speed drive through the transmission is obtained by moving the manual selector 257 and the selector valve piston 134 into their "L" positions. In this position of the valve piston 134, the groove 140 connects the ports 144 and 145, and the groove 142 connects the ports 146 and 147. The regulated fluid pressure in the conduit 112 is supplied through the port 144, the groove 140, the port 149 and the conduit 152 to the forward brake servomotor 60 and the brake 17 is thus applied. The fluid pressure in the conduit 152 passes also through the port 146, the groove 142, the port 147 and the conduit 151 to the low brake servomotor 61, and the brake 18 is also applied. With these two brakes engaged, as has been previously explained, the low speed power train through the transmission is completed. The pressure dome 132 and restriction 131 function as has been previously described in producing a cushioned and gradual engagement of the friction engaging devices connected therewith. The drive shaft pump 80 produces the fluid under pressure in the fluid supply conduit 112 for engaging the brakes 17 and 18 and keeping them engaged until the driven shaft pump 81 increases to a substantial speed, the same as when the vehicle is started and driven in intermediate speed drive.

Reverse drive through the transmission is obtained by moving the manual selector valve piston 134 into its "R" position by means of the manual selector lever 257. In this position the groove 140 in the selector valve piston 134 connects the ports 143, 150 and 144. The conduit 112 containing fluid pressure from the pump 80 is connected with the port 144, and fluid pressure is thus supplied to the conduits 154 and 153. For reverse drive, the fluid pressure in the conduit 112 is obtained from the drive shaft pump 80 exclusive of the driven shaft pump 81, since the latter pump rotates in the reverse direction and does not supply fluid to its outlet conduit 99. The fluid from the pump 80 flows through the conduits 95 and 113 to the fluid pressure supply conduit 112 as in intermediate forward drive, for example, and the front pump relief valve 85 is effective for limiting the pressure in these conduits to a predetermined maximum.

The fluid pressure in the conduit 154 connected with the conduit 112 by means of the valve piston 134 is supplied to the piston groove 121 in the valve 85 through the port 122, and the fluid pressure in this groove is effective to augment the action of the spring 126 and tend to move the valve piston 117 upwardly to decrease the amount of fluid flow between the upper end of the piston 117 and the edge of the port 123. The fluid pressure in the groove 121 is effective to supply this force to the piston 117 since the land end 120a is larger than the land end 119a as shown. The effect of this force on the front pump relief valve piston 117 is to increase the pressure in the conduit 113 and in the connected conduits to a pressure which is substantially greater than that existing in the conduit 113 and connected conduits without any such fluid pressure being supplied to the groove 121 in the piston 117, as in intermediate forward drive, for example. The reverse brake 19 is applied by fluid pressure from the conduit 113 as will be hereinafter explained, and this increased pressure is necessary for providing the requisite holding power in this brake.

The converter pressure as applied to the inlet conduit 211 for the converter 14 would be increased along with the regulated pump pressure in the conduit 112 by the converter valve 87 connected to this conduit except for the application of fluid pressure to the converter valve in reverse drive which counteracts this effect and tends to move the valve piston 195 to reduce the pressure in the conduit 211. The conduit 210 is connected with the conduit 154 supplied with fluid under pressure in reverse drive, and the conduit 210 is connected with the converter valve 87 through the port 207 as shown. Fluid pressure supplied through the port 207 acts against the piston 196 in the converter valve 87 and compresses the spring 202 and tends to move the valve piston 195 to the right through the intermediary of the spring 202, augmenting the action of the fluid pressure applied to the land face 199a on the piston 195 from the converter supply conduit 211 and port 203. Such a tendency of the valve piston 195 to move tends to close communication between the port 206 and the groove 200 in the piston 195 for reducing the fluid pressure in the conduit 211 and in the converter 14. The force on the valve piston 195 tending to move it in one direction due to the increased pressure in the conduit 112 acting on the land face 204a of the piston 195 and the force tending to move the piston 195 in the opposite direction due to the fluid pressure acting on the piston 196 counteract each other, so that the pressure in the conduit 211 remains substantially at the same reduced value as for the forward drives through the transmission.

Fluid pressure supplied to the conduit 153 from the port 150 connected with the regulated fluid pressure supply conduit 112 by the selector valve piston 134 for reverse drive is applied to the piston 67 in the servomotor 62 for the reverse brake 19, and this functions to move the piston against the action of the return spring 70 and begin application of the reverse brake 19, in particular, to take up the slack in the band 54. The piston 66 is movable with the piston 67, and the movement of the piston 66 accompanying that of the piston 67 functions to draw fluid from the sump 94 through the conduit 236, the reverse shuttle valve 89, and conduit 237. The conduit 236 is connected with the conduit 237 through the port 230, the cavity 234 and the port 233 in the reverse shuttle valve 89. When the fluid pressure in the conduit 153 and applied to the piston 67 builds up sufficiently, it functions to move the reverse shuttle valve piston 228 downwardly against the action of the spring 235 so that the reverse shuttle valve piston 228 blocks the port 230 and provides a connection between the ports 232 and 231. Thereupon fluid pressure from the port 150 in the selector valve 83 is supplied to the piston 66 in the servomotor 62 through a portion of the conduit 153, the port 232, the cavity 234, the port 231 and the conduit 236, and full application of the reverse brake 19 is obtained by means of both the pistons 66 and 67.

The piston 66 is initially connected with the sump 94 to draw fluid therefrom as has just been described, so that the full supply of fluid pressure for the two brake pistons 66 and 67 need not entirely be obtained from the pump 80, and a quicker application of the reverse brake is thus obtained. The pressure dome 132 and restriction 131 function, as has been previously described, to cushion engagement of the friction engaging mechanism connected therewith.

The reverse interlock valve 88 functions to prevent the build up of pressure in the conduit 210 and in the connected conduits 154 and 153 until all movement of the vehicle in the forward direction has ceased. Any pressure in the outlet conduit 99 of the driven shaft pump 81 is applied through the conduits 127 and 227 and the port 224 to the land 219 of the reverse interlock valve. When there is appreciable forward movement of the vehicle, there is substantial pressure present in these conduits, and the interlock valve piston 216 is moved against the action of the spring 226 so as to connect the ports 221 and 223. The port 223 is a bleed port as has been described, and the conduits 210 and connected conduits are thereby allowed to freely drain to the sump 94. No application of the reverse brake 19 and completion of the reverse drive power train may be had under these conditions. When the speed of the vehicle in the forward direction decreases, the pressure in the conduit 99 and connected conduits 127 and 227 falls off, and the valve piston 216 is moved by the spring 226 back into its illustrated position blocking the port 221. Thereafter, fluid pressure may exist and be built up in the conduit 210 and connected conduits, so that the reverse brake 19 may be applied. The reverse interlock valve 88 thus prevents any build up of fluid pressure in the servomotor 62 for the reverse brake 19 and the application of this brake until the vehicle has substantially ceased to move forwardly.

The conduit 245 and restricted passage 244 having the check valve 246 therebetween are provided for supplying lubrication to the gearing 174 for the governor 82 from the driven shaft pump 81, and the conduit and passage have the further function of relieving trapped fluid in the outlet conduit 99 of the driven shaft pump 81 after movement of the driven shaft 11 for forward drive of the vehicle has ceased. The check valve 246 will remain open with its ball 247 being off its seat 248 until the fluid pressure within the conduit 99 has decreased to an insubstantial value after the pump 81 has ceased operation from forward rotation of the driven shaft 11, the drainage from the conduit 99 being through the conduit 245 and passage 244. Any fluid pressure in the conduit 99 which would tend to maintain the reverse interlock valve piston 216 in its position connecting the conduit 210 with the sump 94 through the ports 221 and 223 and the groove 220 is thus removed, instead of being trapped in a closed system, when the vehicle is stationary, and the interlock valve 88 is ineffective to prevent a completion of the reverse drive power train.

The motor 254 having the piston 253 therein is provided for preventing movement of the parking brake pawl 251 into engagement with the toothed wheel 250 whenever there is substantial movement of the vehicle in the forward direction. The piston 253 is connected with the outlet conduit 99 of the driven shaft pump 81 through the conduit 255, and fluid under pressure from the pump 81 transmitted through this conduit functions to hold the piston 253 against the action of the spring 256 in its position to cooperate with the extension 252 on the pawl 251 so that the pawl may not be moved into engagement with the toothed wheel 250. This motor 254 thus functions as a safety device to prevent engagement of the pawl 251 and possible breakage of it when the driven shaft 11 and the toothed wheel 250 are in motion.

The brakes 278 and 280 for the rear and front road wheels of the vehicle are applied, as in ordinary hydraulic brake systems, by depressing the vehicle brake pedal 284 to move the piston 283 in the master cylinder 282 and thereby provide fluid pressure to the motors 279 and 281 for the wheel brakes. The front wheel brake motors 281 are directly connected to the master cylinder 282 by means of the conduit 285, and the rear wheel brake motors 279 are connected with the master cylinder 282 by means of the conduit 286 and through the valve mechanism 287 which always provides a substantially unrestricted flow of fluid to the rear brake motors 279 from the master cylinder 282.

The winding 289 of the valve mechanism 287 is connected in series with both the switch 272 and the switch 307 as has been described. The switch 272 is hydraulically connected with the outlet conduit 99 of the driven shaft pump 81 by means of the conduit 277, and when there is substantial pressure in the conduit 99, the combination diaphragm and switch arm 275 is held separated from the contacts 273 and 274 against the action of the spring 276 by the fluid pressure on the switch arm. When, however, the speed of the vehicle decreases below some relatively low vehicle speed, 5 miles per hour, for example, with the resultant decrease in fluid pressure in the conduit 99, the fluid pressure acting on the combination diaphragm and switch arm 275 does not remain sufficient to hold the switch arm 275 separated from the contacts 273 and 274 against the action of the spring 276, and the switch arm bridges these contacts and completes a circuit through them.

The switch 307 is mounted on the throttle lever 179 as has been described, and when the accelerator 170 of the vehicle is released to its closed throttle position, the contact 309 abuts against the stop 313 provided on the vehicle carburetor and is held in this relation with the stop by the action of the spring 314. The contact 309 is thus held in contact with the contact 310 against the action of the spring 312, and an electric circuit is completed between the two contacts to the switch casing 308 which is grounded. When the accelerator is moved toward an open throttle position and out of its closed throttle position, the throttle lever 179 is moved correspondingly and moves the contact 309 out of abutting relation with the stop 313 so that the spring 312 in the switch 307 is effective to move the contact 309 out of contact with the contact 310 and open the switch 307. Thus it will be apparent that when the vehicle is travelling below a predetermined low speed and the acelerator 170 is released and in its closed throttle position, the two switches 272 and 307 will be closed and an electric circuit will be completed through the winding 289 of the valve mechanism 287 thus energizing the winding, assuming, of course, that the ignition switch 305 in series with the switches 272 and 307 is closed.

Fluid pressure from the master cylinder 282 provided by a depression of the brake pedal 284 flows through the passage 300 around the armature 298, as well as through the armature and ports 299 and 301, to the seating member 293, and it passes through the ports 294 in the seating member and moves the valve member 295 off the ports 294, so that the fluid passing through the latter ports flows through the central opening 296 in the valve member 295 and through the cavity 291 toward the brake motors 279. The rear brakes 278 will thus be applied simultaneously with application of the front brakes 280 due to the direct application of fluid pressure to the front brake motors 281 from the master cylinder through the conduit 285. Assuming that the winding 289 is not energized when the brake pedal 284 is released for releasing the brakes, due to the fact that the vehicle speed is too high or the fact that the accelerator 170 is depressed, the fluid in the conduit 286 between the valve mechanism 287 and the rear brake motors 279 will flow back through the central opening 296 in the valve element 295, the central opening 292 in the seating member 293 and around and through the armature 298 back toward the master cylinder. The armature 298 under these conditions will be moved toward the right as seen in Fig. 7 so that its centrally located valve member 302 is not pressed against the seating member 293, and there is substantially no restriction of return fluid flow through the central opening 292 in the member 293. Under these conditions the valve element 295 is held by the spring 297 against the openings 294 and blocks the openings.

When the winding 289 is energized due to the speed of the vehicle in the forward direction being below a predetermined value and the accelerator 170 being released, the armature 298 is drawn into the winding 289 and holds its valve member 302 with force from the spring 304 in abutting relation with the seating member 293 to close the port 292 in the seating member 293. The application of the rear brakes 278 under these conditions is substantially the same as before with the fluid passing through the ports 294 in the seating member 293 and moving the valve element 295 off the ports 294; however, when the brake pedal 284 is released, the armature 298 and its valve member 302 function to maintain a predetermined reduced pressure in the cavity 291 and applied to the rear brake motors 279. The spring 297 functions to hold the valve member 295 against the the ports 294 on this return of fluid from the brake motors, and fluid cannot therefore flow through the ports 294. Some of the fluid flows through the ports 296 and 292 and moves the valve member 302 off the seating member 293 against the action of the spring 304; however, the amount of fluid that may flow through these ports is limited by the spring pressed valve member 302 held with its insert 303 against the seating member 293, so that the pressure in the cavity 291 remains at a predetermined reduced value which is sufficient to maintain the rear brakes 278 applied with an intensity great enough to prevent movement of the vehicle forwardly due to torque being transmitted through the transmission with the brake 17 applied for the intermediate speed drive and with the vehicle engine accelerator released to its closed throttle engine idling position. Thus the so called drag torque which is transmitted through the transmission when the selector 257 is in its "D" position completing the intermediate speed power train with the vehicle engine being run at idling speed is counteracted due to this engagement of the rear wheel brakes 278, after the vehicle brakes have once been applied by depression of the vehicle brake pedal 284. It therefore is not necessary for the vehicle operator to keep the brake pedal 284 depressed for preventing the vehicle from creeping forwardly under these conditions; this effect is obtained automatically by the illustrated braking system. A subsequent movement of the accelerator 170 toward an open throttle position for starting the vehicle opens the switch 307 and allows the armature 298 to return to a nonenergized position. In this position, the armature 298 allows the pressure in the rear wheel brake motors 279 to be released resulting in a complete disengagement of the rear wheel brakes. Since there is never any impediment to fluid flow in the conduit 285, the front wheel brakes 280 always release completely when the brake pedal 284 is released.

The restricted passage 239 and conduit 238 advantageously provide communication between the driven shaft pump 81 and the hydraulic torque converter 14 which allows the burden of supplying fluid pressure to the converter 14 to be taken gradually by the rear pump 81 so that this load is not suddenly put on the pump when the rear pump relief valve 86 moves to dump and deactivate the front pump 80 whereby vibration and shuttling of the rear pump relief valve piston 100 is prevented.

I wish it to be understood that my invention is not to be limited to the specific constructions and arrangements shown and described except only in so far as the claims may be so limited, as it will be apparent to those

I claim:

1. In transmission mechanism, the combination of a drive shaft, a driven shaft, means for providing a power train between said shafts and including fluid pressure charged means for completing the power train, a first source of fluid pressure for said pressure charged means and including a pump rotatable with said drive shaft, a second source of fluid pressure for said pressure charged means and including a pump rotatable with said driven shaft, valve means providing a connection between said driven shaft pump and said pressure charged means on movement of the valve means when the driven shaft pump increases sufficiently in speed to supply substantial pressure, and means providing a second connection between said driven shaft pump and said pressure charged means whereby said driven shaft pump may supply a part of the fluid requirements of said pressure charged means before movement of said valve means.

2. In transmission mechanism, the combination of a drive shaft, a driven shaft, means for providing a power train between said shafts and including fluid pressure charged means for completing the power train, a first source of fluid pressure for said pressure charged means and including a pump rotatable with said drive shaft, a second source of fluid pressure for said pressure charged means and including a pump rotatable with said driven shaft, valve means responsive to the pressure from said driven shaft pump for providing a connection between said driven shaft pump and said pressure charged means on movement of the valve means when the driven shaft pump increases sufficiently in speed to supply substantial pressure, and means for providing a second connection between said driven shaft pump and said pressure charged means whereby said driven shaft pump may supply a part of the fluid requiremtnts of said pressure charged means before movement of said valve means.

3. In transmission mechanism, the combination of a drive shaft, a driven shaft, means for providing a power train between said shafts and including a hydrodynamic coupling device adapted to be charged with fluid pressure for completing the power train, a first source of fluid pressure for said hydrodynamic device and including a pump rotatable with said drive shaft, a second source of fluid pressure for said hydrodynamic device and including a pump rotatable with said driven shaft, valve means responsive to an increase in the pressure from said driven shaft pump for providing a connection between said driven shaft pump and said hydrodynamic device, valve means responsive to an increase in the pressure from said driven shaft pump for disconnecting said drive shaft pump from said hydrodynamic device, and means providing a second connection between said driven shaft pump and said hydrodynamic device whereby said driven shaft pump may supply a part of the fluid requirements of said hydrodynamic device before such increases in pressure.

4. In transmission mechanism, the combination of a drive shaft, a driven shaft, means for providing a power train between said shafts and including fluid pressure charged means for completing the power train, a first source of fluid pressure for said pressure charged means and including a pump rotatable with said drive shaft, a second source of fluid pressure for said pressure charged means and including a pump rotatable with said driven shaft, valve means responsive to an increase in the pressure from said driven shaft pump for providing a connection between said driven shaft pump and said pressure charged means, valve means responsive to an increase in the pressure from said driven shaft pump for disconnecting said drive shaft pump from said pressure charged means, a valve for reducing the pressure applied to said pressure charged means with respect to that of said driven shaft pump applied to said first named valve means, and means providing a restricted second fluid connection between said driven shaft pump and said pressure charged means whereby said driven shaft pump may supply a part of the fluid requirements of said pressure charged means before such increases in pressure.

5. In transmission mechanism, the combination of a drive shaft, a driven shaft, means for providing a power train between said shafts and including a hydrodynamic coupling device adapted to be charged with fluid pressure for completing the power train, a first source of fluid pressure for said hydrodynamic device and including a pump rotatable with said drive shaft, a second source of fluid pressure for said hydrodynamic device and including a pump rotatable with said driven shaft, valve means responsive to an increase in the fluid pressure discharged from said driven shaft pump for connecting said driven shaft pump with said hydrodynamic device, valve means responsive to an increase in the pressure discharged from said driven shaft pump for disconnecting said drive shaft pump and said hydrodynamic device, pressure reducing valve means for connecting said driven shaft pump with said hydrodynamic device, means providing a restricted passage between said driven shaft pump and said hydrodynamic device whereby said driven shaft pump may supply a part of the fluid requirements of said hydrodynamic device before such increases in pressure, and a check valve in series with said restricted passage for preventing fluid flow from said hydrodynamic device to said driven shaft pump before the pressure output of the latter pump increases to the pressure applied to said hydrodynamic device from said drive shaft pump.

6. In transmission mechanism, the combination of a drive shaft, a driven shaft, means for providing a power train between said shafts and including fluid pressure charged means for completing the power train, a first source of fluid pressure for said pressure charged means and including a pump rotatable with said drive shaft, a second source of fluid pressure for said pressure charged means and including a pump rotatable with said driven shaft, a relief valve subject to the fluid pressure discharge of said driven shaft pump and having a first position in which it blocks the discharge from said driven shaft pump and having a second position in which it meters the discharge from said driven shaft pump for maintaining the output pressure of the driven shaft pump at a predetermined maximum value and allows free discharge of the output of said drive shaft pump, a check valve between said fluid pressure charged means and said driven shaft pump opening to connect the driven shaft pump and said charged means when said drive shaft pump is allowed to freely discharge by movement of said relief valve, a pressure reducing valve connecting said pumps and said charged means, means providing a restricted passage between said driven shaft pump and said pressure charged means whereby said driven shaft pump may supply a part of the fluid requirements of said pressure charged means before movement of said relief valve from its said first position to its said second position, and a check valve in series with said restricted passage for preventing communication therethrough when the pressure of said fluid pressure charged means is greater than the fluid pressure discharge of said driven shaft pump.

7. In transmission mechanism, the combination of a drive shaft, a driven shaft, means for providing a power train between said shafts and including a fluid pressure actuated friction engaging mechanism and a hydrodynamic coupling device for completing the power train, a first source of fluid pressure for said hydrodynamic device and said friction mechanism and including a pump rotatable with said drive shaft, a second source of fluid pressure for said hydrodynamic device and said friction mechanism and including a pump rotatable with said driven shaft, valve means for connecting said driven shaft pump with said friction mechanism and said hydrodynamic device on movement of the valve means and subject to the pressure from said driven shaft pump for causing such movement of the valve means, pressure reducing valve means connected with said pumps for providing a reduced pressure to said hydrodynamic coupling device, and means providing a conduit connecting directly said hydrodynamic device and said driven shaft pump for providing a connection therebetween whereby said driven shaft pump may supply a part of the fluid requirements of said hydrodynamic device before movement of said valve means.

8. In transmission mechanism, the combination of a drive shaft, a driven shaft, means for providing a power train between said shafts and including a fluid pressure actuated friction engaging mechanism and a hydrodynamic coupling device for completing the power train, a first source of fluid pressure for said friction mechanism and for said hydrodynamic device and including a pump rotatable with said drive shaft, a second source of fluid pressure for said hydrodynamic device and said friction mechanism and including a pump rotatable with said driven shaft, a relief valve subject to the pressure of discharge of said driven shaft pump and having a first position in which said drive shaft pump is connected with said friction mechanism and said hydrodynamic device and having a second position in which it regulates the pressure of discharge of said driven shaft pump to a predetermined maximum and allows free discharge of said drive shaft pump, a check valve between said driven shaft pump and said friction mechanism and hydrodynamic device for checking flow from said driven shaft pump to said friction mechanism and hydrodynamic device when said drive shaft pump is operative to supply the friction mechanism and hydrodynamic device with fluid pressure, a pressure reducer valve between said pumps and said hydrodynamic device for reducing the pressure applied to the latter as compared to the pressure applied to said friction mechanism, means providing a restricted conduit directly connecting said driven shaft pump and said hydrodynamic device whereby said driven shaft pump may supply a part of the fluid requirements of said hydrodynamic device before movement of said relief valve into its driven shaft pump regulating position, and a check valve in said restricted conduit which is closed until the pressure of discharge of said driven shaft pump increases to above the fluid pressure applied to said hydrodynamic device.

9. In transmission mechanism, the combination of a drive shaft, a driven shaft, means for providing a power train between said shafts and including a fluid pressure utilizable means rendered effective by fluid pressure supplied thereto for completing the power train, a first pump for supplying fluid pressure to said fluid pressure utilizable means, means for driving said pump, a second pump also for supplying fluid pressure at times to said fluid pressure utilizable means, means for driving said second pump, valve means for providing a connection between said second pump and said fluid pressure utilizable means on movement of the valve means when the second pump increases to a predetermined speed, and means providing a second connection between said second pump and said fluid pressure utilizable means whereby said second pump may supply a part of the fluid requirements of said fluid pressure utilizable means before movement of said valve means.

10. In transmission mechanism, the combination of a drive shaft, a driven shaft, means for providing a power train between said shafts and including fluid pressure utilizable means rendered effective by fluid pressur supplied thereto for completing the power train, a first pump for supplying fluid pressure to said fluid pressure utilizable means and connected to be driven by said drive shaft, a second pump also for supplying fluid pressure at times to said fluid pressure utilizable means and driven by said driven shaft, valve means for providing a connection between said second pump and said fluid pressure utilizable means on movement of the valve means when the second pump increases to a predetermined speed, and means providing a second connection between said second pump and said fluid pressure utilizable means whereby said second pump may supply a part of the fluid requirements of said fluid pressure utilizable means before movement of said valve means.

11. In transmission mechanism, the combination of a drive shaft, a driven shaft, means for providing a power train between said shafts and including fluid pressure utilizable means rendered effective by fluid pressure supplied thereto for completing the power train, a first pump for supplying fluid pressure to said fluid pressure utilizable means and connected to be driven by said drive shaft, a second pump also for supplying fluid pressure at times to said fluid pressure utilizable means and driven by said driven shaft, valve means responsive to the fluid pressure output of said second pump for providing a connection between said second pump and said fluid pressure utilizable means on movement of the valve means when the second pump increases sufficiently in speed to supply a predetermined pressure, and means providing a second connection between said second pump and said fluid pressure utilizable means whereby said second pump may supply a part of the fluid requirements of said fluid pressure utilizable means before movement of said valve means.

12. In transmission mechanism, the combination of a drive shaft, a driven shaft, means for providing a power train between said shafts and including fluid pressure utilizable means rendered effective by fluid pressure supplied thereto for completing the power train, a first pump for supplying fluid pressure to said fluid pressure utilizable means, means for driving said pump, a second pump also for supplying fluid pressure at times to said fluid pressure utilizable means, means for driving said second pump, means providing a connection between said second pump and said fluid pressure utilizable means effective when the second pump increases to a predetermined low speed and means providing a second connection between said second pump and said fluid pressure utilizable means effective when the second pump increases to a predetermined high speed, whereby said second pump gradually assumes the supply of the fluid requirements of said fluid pressure utilizable means.

13. In transmission mechanism, the combination of a drive shaft, a driven shaft, means for providing a power train between said shafts and including fluid pressure utilizable means rendered effective by fluid pressure supplied thereto for completing the power train, a first pump for supplying fluid pressure to said fluid pressure utilizable means, means for driving said pump, a second pump also for supplying fluid pressure at times to said fluid pressure utilizable means, means for driving said second pump, means providing a connection between said second pump and said fluid pressure utilizable means for supplying pressure to said fluid pressure utilizable means effective when the pressure from said second pump increases to a predetermined low value, and means providing a second connection between said second pump and said fluid pressure utilizable means effective when the pressure from said second pump increases to a predetermined high value, whereby said second pump gradually assumes the supply of the fluid requirements of said fluid pressure utilizable means.

14. In transmission mechanism, the combination of a drive shaft, a driven shaft, means for providing a power train between said shafts and including fluid pressure utilizable means rendered effective by fluid pressure supplied thereto for completing the power train, a first pump for supplying fluid pressure to said fluid pressure utilizable means, means for driving said pump, a second pump also for supplying fluid pressure at times to said fluid pressure utilizable means, means for driving said second pump, valve means responsive to the fluid pressure output of said second pump providing a connection between said second pump and said fluid pressure utilizable means to supply fluid pressure to the latter when the output of the second pump increases to a predetermined low pressure, and valve means responsive to the fluid pressure output of said second pump for providing a second connection between said second pump and said fluid pressure utilizable means when the output of the second pump increases to a predetermined high pressure, whereby said second pump gradually assumes the supply of the fluid requirements of said fluid pressure utilizable means.

15. In transmission mechanism; the combination of a drive shaft; a driven shaft; means for providing a power train between said shafts and including fluid pressure utilizable means rendered effective by fluid pressure supplied thereto for completing the power train; a first pump for supplying fluid pressure to said fluid pressure utilizable means; means for driving said pump; a second pump also for supplying fluid pressure at times to said fluid pressure utilizable means; means for driving said second pump; means providing a connection between said second pump and said fluid pressure utilizable means for supplying pressure to said fluid pressure utilizable means effective when the pressure from said second pump increases to a predetermined high value; and means for providing a second connection, which is relatively restricted in comparison to said first named connection, between said second pump and said fluid pressure utilizable means effective when the pressure from said second pump increases to a predetermined low value, whereby said second pump gradually assumes the supply of the fluid requirements of said fluid pressure utilizable means.

16. In transmission mechanism, the combination of a drive shaft, a driven shaft, means for providing a power train between said shafts and including a fluid pressure utilizable means rendered effective by fluid pressure supplied thereto for completing the power train, a first pump for supplying fluid pressure to said fluid pressure utilizable means, means for driving said pump, a second pump also for supplying fluid pressure at times to said fluid pressure utilizable means, means for driving said second pump, means providing a restricted connection between said second pump and said fluid pressure utilizable means and including valve means responsive to the fluid pressure output of said second pump to open the connection when the output of said second pump increases to a predetermined low fluid pressure, and means providing a second relatively unrestricted connection between said second pump and said fluid pressure utilizable means and including a second valve means responsive to the fluid pressure output of said second pump for opening said second connection on movement of said second valve means when the second pump output pressure increases to a predetermined high value, whereby said second pump gradually assumes the supply of the fluid requirements of said fluid pressure utilizable means.

17. In transmission mechanism, the combination of a drive shaft, a driven shaft, means for providing a power train between said shafts and including fluid pressure utilizable means rendered effective by fluid pressure supplied thereto for completing the power train, a first pump for supplying fluid pressure to said fluid pressure utilizable means, means for driving said pump, a second pump also for supplying fluid pressure at times to said fluid pressure utilizable means, means for driving said second pump, valve means responsive to the pressure from said second pump for providing a relatively restricted connection between said second pump and said fluid pressure utilizable means for supplying pressure to said fluid pressure utilizable means effective when the pressure from said second pump increases to a predetermined low pressure, and valve means responsive to the pressure from said second pump for providing a relatively unrestricted connection between said second pump and said fluid pressure utilizable means and for disconnecting said first pump and said fluid pressure utilizable means on movement of said last named valve means when the output pressure of said second pump increases to a predetermined relatively high pressure, whereby said second pump gradually assumes the supply of the fluid requirements of said fluid pressure utilizable means.

18. In a fluid system, the combination of a fluid pressure utilizable means, a pump for supplying a fluid pressure to said fluid pressure utilizable means, a second pump for also at times supplying a fluid pressure to said fluid pressure utilizable means, means for providing a connection between said second pump and said fluid pressure utilizable means to supply fluid pressure to the latter means from said second pump and effective when said second pump reaches a predetermined low speed, and means providing a second connection between said second pump and said fluid pressure utilizable means and effective when said second pump reaches a predetermined high speed, whereby said second pump gradually assumes the supply of the fluid requirements of said fluid pressure utilizable means.

19. In a fluid system, the combination of a fluid pressure utilizable means, a pump for supplying a fluid pressure to said fluid pressure utilizable means, a second pump for also at times supplying a fluid pressure to said fluid pressure utilizable means, means for providing a connection between said second pump and said fluid pressure utilizable means and responsive to the fluid pressure output of said second pump to complete said connection for supplying fluid from said second pump to said fluid pressure utilizable means when the output of said second pump increases to a predetermined low pressure, and means providing a second connection between said second pump and said fluid pressure utilizable means and responsive to the fluid pressure output of said second pump for completing the connection to supply fluid from said second pump to said fluid pressure utilizable means when the output of said second pump increases to a predetermined high pressure, whereby said second pump gradually assumes the supply of the fluid requirements of said fluid pressure utilizable means.

20. In a fluid system, the combination of a fluid pressure utilizable means, a pump for supplying a fluid pressure to said fluid pressure utilizable means, a second pump for also at times supplying a fluid pressure to said fluid pressure utilizable means, valve means responsive to the fluid pressure output of said second pump operable to provide a relatively restricted connection from said second pump to said fluid pressure utilizable means on movement of the valve means when the output of said second pump increases to a predetermined low pressure, and valve means responsive to the fluid pressure output of said second pump operable to provide a second relatively unrestricted connection from said second pump to said fluid pressure utilizable means on an increase in the fluid pressure output of said second pump to a predetermined high pressure, whereby said second pump gradually assumes the supply of the fluid requirements of said fluid pressure utilizable means.

21. In a fluid system, the combination of a fluid pressure utilizable means, a pump for supplying a fluid pressure to said fluid pressure utilizable means, a second pump for also at times supplying a fluid pressure to said fluid pressure utilizable means, valve means responsive to the fluid pressure output of said second pump operable to provide a relatively restricted connection from said second pump to said fluid pressure utilizable means on movement of the valve means by an increase in the fluid pressure output of said second pump to a predetermined low pressure, valve means responsive to the fluid pressure output of said second pump operable to provide a relatively unrestricted connection from said second pump to said fluid pressure utilizable means and for disconnecting said first named pump from said fluid pressure utilizable means on movement of said last named valve means by an increase in the fluid pressure output of said second pump to a predetermined high pressure, whereby said second pump gradually assumes the supply of the fluid requirements of said fluid pressure utilizable means.

References Cited in the file of this patent

UNITED STATES PATENTS

| | | |
|---|---|---|
| 2,332,593 | Nutt et al. | Oct. 26, 1943 |
| 2,343,955 | Cotterman | Mar. 14, 1944 |
| 2,516,203 | Greenlee | July 25, 1950 |
| 2,516,208 | Hasbany | July 25, 1950 |
| 2,548,208 | Evernden | Apr. 10, 1951 |
| 2,640,373 | Jandasek | June 2, 1953 |